(12) United States Patent  (10) Patent No.: US 8,546,746 B2
Mori et al.  (45) Date of Patent:  Oct. 1, 2013

| | |
|---|---|
| (54) PHOTOELECTRIC ENCODER AND PHOTOELECTRIC ENCODER SYSTEM | |
| (75) Inventors: Hiroatsu Mori, Kawasaski (JP); Tsuyoshi Kuroiwa, Kawsaki (JP); Yuichi Ichikawa, Kawasaki (JP); Hiroaki Kawada, Kawasaki (JP) | |
| (73) Assignee: Mitutoyo Corporation, Kawasaki (JP) | |
| ( * ) Notice: Subject to any disclaimer, the term of this patent is extended or adjusted under 35 U.S.C. 154(b) by 102 days. | |
| (21) Appl. No.: 13/269,840 | |
| (22) Filed: Oct. 10, 2011 | |
| (65) Prior Publication Data | |
| US 2012/0097843 A1    Apr. 26, 2012 | |
| (30) Foreign Application Priority Data | |
| Oct. 26, 2010   (JP) .................................. 2010-239355 | |
| (51) Int. Cl. *G01D 5/347* (2006.01) *G01D 5/38* (2006.01) | |
| (52) U.S. Cl. USPC .................................. 250/231.13; 250/237 G | |
| (58) Field of Classification Search USPC ............... 250/231.13, 231.14, 237 G, 231.16, 250/231.18, 237 R, 214 R, 239; 341/11, 341/13, 8 See application file for complete search history. | |

(56) References Cited

U.S. PATENT DOCUMENTS 6,906,315 B2 * 6/2005 Tobiason .................. 250/237 R
7,067,797 B1 * 6/2006 Mitchell et al. ........... 250/231.13

FOREIGN PATENT DOCUMENTS

| JP | 2004-053605 | 2/2004 |
| JP | 2007-232681 | 9/2007 |
| JP | 2008-039602 | 2/2008 |

* cited by examiner

*Primary Examiner* — Georgia Y Epps
*Assistant Examiner* — Carolynn Moore
(74) *Attorney, Agent, or Firm* — Rankin, Hill & Clark LLP

(57) ABSTRACT

A photoelectric encoder includes a scale in which diffraction gratings are formed at predetermined pitches in a measurement axis direction, a detection head which is relatively movable with respect to the scale, and which includes an illuminating portion configured to illuminate the scale, and a light receiving portion configured to receive light reflected by or transmitted through the diffraction gratings of the scale, a signal processing device configured to process a light reception signal output from the light receiving portion of the detection head, and a signal transmitting unit configured to transmit a signal between the detection head and the signal processing device. The signal processing device includes a display unit configured to display information indicating an attachment posture of the detection head with respect to the scale.

16 Claims, 12 Drawing Sheets

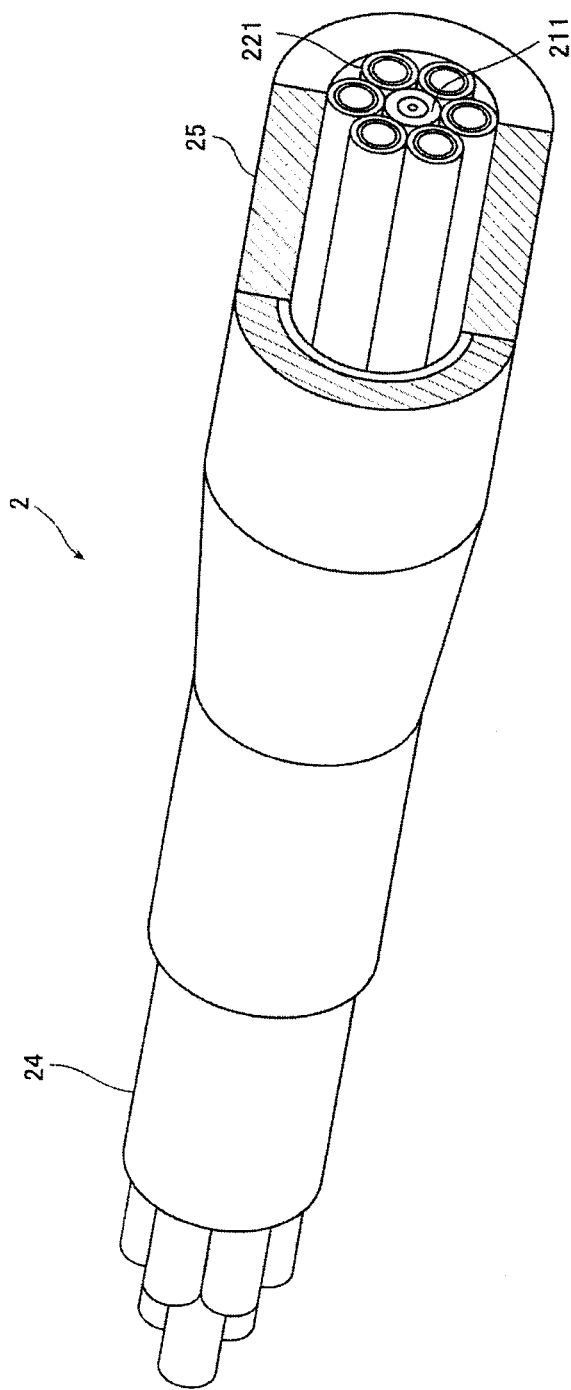

NOT ROTATED

ROTATION IN YAWING DIRECTION

NOT ROTATED

ROTATION IN PITCHING DIRECTION

NOT ROTATED

ROTATION IN ROLLING DIRECTION

PHOTOELECTRIC ENCODER AND PHOTOELECTRIC ENCODER SYSTEM

CROSS REFERENCE TO RELATED APPLICATION(S)

This application is based upon and claims the benefit of priority from Japanese Patent Application No. 2010-239355 filed on Oct. 26, 2010, the entire contents of which are incorporated herein by reference.

TECHNICAL FIELD

The present invention relates to a photoelectric encoder and a photoelectric encoder system which is to be used in a linear scale or the like.

RELATED ART

In a photoelectric encoder using a phase grating scale, the phase grating scale is irradiated with coherent light from a point light source disposed in a head to produce an interference fringe of diffraction light having position information of the scale, and the interference fringe is phase detected by a light receiving element disposed in the head, whereby a length corresponding to the relative moving distance of the head with respect to the scale can be measured (see Patent References 1 to 3).

PRIOR ART REFERENCE

[Patent Reference]
 [Patent Reference 1] JP-A-2004-53605
 [Patent Reference 2] JP-A-2007-232681
 [Patent Reference 3] JP-A-2008-39602

In such a photoelectric encoder, the user attaches the scale and the head to two measurement objects which are relatively displaced from each other, respectively. The scale and the head must be attached in an adequate positional relationship so that light emitted from a light emitting element is reflected by or transmitted through the scale, and received by the light receiving element, and the intensity of the light received by the light receiving element is within a predetermined range.

In such an encoder, when the head is to be attached to an apparatus, the position of the head (particularly, in the yawing and gap directions with respect to the scale) is adjusted so that a predetermined signal is obtained, the maximum signal amplitude is obtained, and then the gain of the output signal is adjusted. The signal adjustment is mainly performed on an electric circuit board which is disposed in a signal processing portion, by using an oscilloscope. However, a pass/fail determination in the adjustment is hardly performed, and that the preparation and working of the adjustment require a prolonged time period.

SUMMARY

Exemplary embodiments of the invention provide a photoelectric encoder and a photoelectric encoder system in which the workability of attachment and adjustment of a detection head is improved.

A photoelectric encoder according to an exemplary embodiment of the invention comprises:
 a scale in which diffraction gratings are formed at predetermined pitches in a measurement axis direction;
 a detection head which is relatively movable with respect to the scale, and which includes an illuminating portion configured to illuminate the scale, and a light receiving portion configured to receive light reflected by or transmitted through the diffraction gratings of the scale;
 a signal processing device configured to process a light reception signal output from the light receiving portion of the detection head; and
 a signal transmitting unit configured to transmit a signal between the detection head and the signal processing device,
 wherein the signal processing device includes a display unit configured to display information indicating an attachment posture of the detection head with respect to the scale.

A photoelectric encoder system according to an exemplary embodiment of the invention comprises:
 a photoelectric encoder including a scale in which diffraction gratings are formed at predetermined pitches in a measurement axis direction, a detection head which is relatively movable with respect to the scale, and which includes an illuminating portion configured to illuminate the scale, and a light receiving portion configured to receive light reflected by or transmitted through the diffraction gratings of the scale, and a signal processing device configured to process a light reception signal output from the light receiving portion of the detection head; and
 an information processing apparatus which is connected to the signal processing device through a first signal transmitting unit,
 wherein the information processing apparatus includes a display unit configured to display information indicating an attachment posture of the detection head with respect to the scale.

The signal processing apparatus may be provided in the detection head. Alternatively, the signal processing apparatus may be connected to the detection head via a second signal transmitting unit.

According to the configuration, the attachment posture of the detection head can be visually checked on the display unit, and therefore the workability of attachment and adjustment of the detection head is improved. Even when the detection head is disposed in a hardly visible place, the adjustment work can be easily performed. When the detection head and the display unit are separated from each other, the detection head can be miniaturized, and separation of a heat generating source can be realized. Therefore, an accurate measurement is enabled.

The signal transmitting unit may be a cable or a wireless transmitting unit.

The light receiving portion may be placed in a periphery of the illuminating portion with forming a predetermined gap in the measurement axis direction and a direction which is perpendicular to the measurement axis direction, and be configured to receive the light which is emitted from the illuminating portion and reflected by the diffraction gratings of the scale.

The photoelectric encoder may further comprise:
 a plurality of transmission type diffraction gratings, which are placed on a light receiving surface of the light receiving portion and are placed at an equal distance from the illuminating portion, wherein
 the light receiving portion includes a displacement detection light receiving portion configured to detect displacement in the measurement axis direction with respect to the scale, and a posture monitor light receiving portion configured to detect at least one of pitching, rolling, and yawing of the light receiving surface with respect to the scale about the illuminating portion, and
 the display unit is configured to display at least one of pitching, rolling, and yawing which is detected by the posture monitor light receiving portion.

The displacement detection light receiving portion may have four displacement detection light receiving surfaces, which are equally placed about the illuminating portion in the measurement axis direction and a direction that is perpendicular to the measurement axis direction, and on which transmission type diffraction gratings of four phases that are shifted by 90° from each other are placed, the posture monitor light receiving portion may have two monitor light receiving surfaces, which are equally placed about the illuminating portion in a direction that is perpendicular to the measurement axis direction and on which a pair of transmission-type diffraction gratings is placed, and the signal processing device may be configured to detect pitching of the light receiving surfaces from an amplitude difference of light reception signals of the displacement detection light receiving portion, to detect rolling from an amplitude difference of light reception signals of the posture monitor light receiving portion, and to detect yawing from a phase difference of the light reception signals of the posture monitor light receiving portion.

The detection head may include a first optical fiber which has the illuminating portion at a tip end, a plurality of second optical fibers which are placed in a periphery of the first optical fiber, and which have the light receiving portion at a tip end, and a cylindrical ferrule which covers the tip end sides of the first and second optical fibers, and the cable may include the first and second optical fibers.

According to the exemplary embodiments of the invention, it is possible to provide a photoelectric encoder and a photoelectric encoder system in which the workability of attachment and adjustment of a detecting portion is excellent.

BRIEF DESCRIPTION OF THE DRAWINGS

FIG. 3 is a perspective view showing the detection head in the photoelectric encoder, partly cutaway.

DETAILED DESCRIPTION

[First Embodiment]

Next, a photoelectric encoder of a first embodiment of the invention will be described in detail with reference to the drawings.

Figure 1:
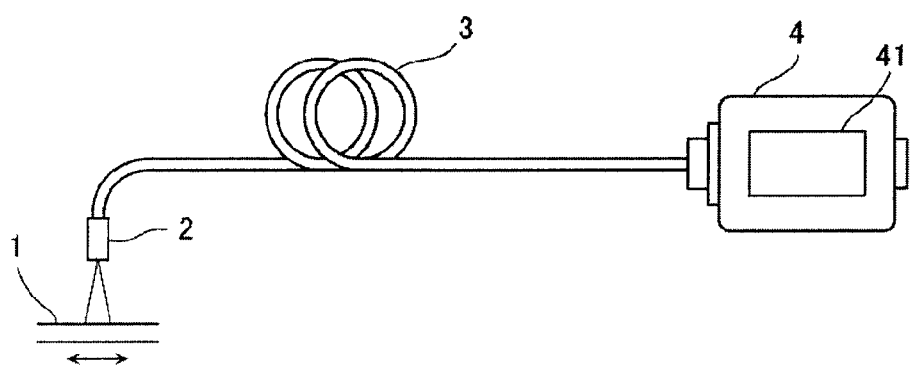
FIG. 1 is a view showing a configuration of a photoelectric encoder of a first embodiment of the invention.

FIG. 1 is a view showing the configuration of the photoelectric encoder of the first embodiment of the invention. The photoelectric encoder of the first embodiment of the invention includes a scale 1 and a detection head 2. In the scale 1, reflection type diffraction gratings are formed at predetermined pitches in the measurement axis. The detection head 2 is opposed to the surface of the scale 1 in which the diffraction gratings are formed, through a predetermined gap, and is relatively movable. The detection head 2 is connected to a signal processing device 4 through a cable 3. The signal processing device 4 configures an interface which is connected to an external information processing apparatus (for example, a PC), and includes a display device 41 and a signal processing circuit 42 (FIG. 5) which will be described later.

Figure 2A:
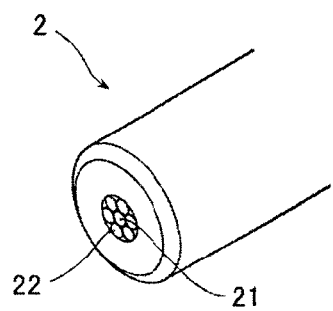
FIGS. 2A and 2B are schematic views of a detection head in the photoelectric encoder.
Figure 2B:
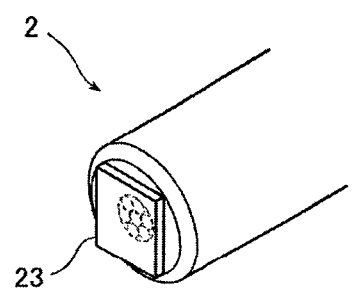

FIGS. 2A and 2B are views of the detection head 2 in the above-described photoelectric encoder, and FIG. 3 is a perspective view of the detection head 2 and the cable 3, partly cutaway.

The cable 3 is configured by bundling a plurality of optical fibers. In the embodiment, as shown in FIG. 3, the cable 3 is configured by bundling six light-receiving optical fibers 221 around an illumination optical fiber 211. Tip end portions of the cables are covered by a ferrule 25 to configure the detection head 2. For example, a single-mode fiber is used as the illumination optical fiber 211, and multi-mode fibers are used as the light-receiving optical fibers 221. The illumination optical fiber 211 and the light-receiving optical fibers 221 are accommodated in a inner tube 24 having an inner diameter which is slightly larger than the circumscribing diameter of the bundle (hereinafter, the diameter is referred to as the bundle diameter). As shown in FIG. 2A, the tip end of the illumination optical fiber 211 configures an illuminating portion 21, and the tip ends of the light-receiving optical fibers 221 configure light receiving portions 22, respectively. As shown in FIG. 2B, a mask 23 having reflection type diffraction gratings is attached to the front surfaces of the illuminating portion 21 and the light receiving portions 22.

Figure 4:
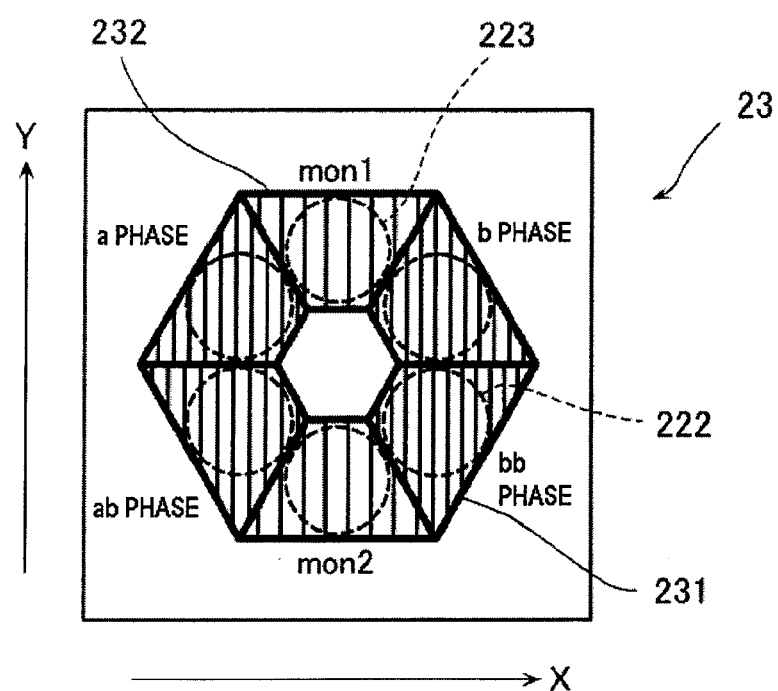
FIG. 4 is a view showing a mask of the photoelectric encoder.

FIG. 4 is a view showing in detail the mask 23.

Four light receiving portions 22 which are placed respectively in upper left, upper right, lower left, and lower right places centered at the illuminating portion 21 are formed as a displacement detection light receiving portion 222. Two light receiving portions 22 which are placed respectively in upper and lower places are formed as a posture monitor light receiving portion 223. Four displacement detection diffraction gratings 231 and two posture monitor diffraction gratings 232 which configure the mask 23 are disposed so as to be located on the front surfaces of the displacement detection light receiving portion 222 and the posture monitor light receiving portion 223, respectively. The displacement detection diffraction gratings 231 and the posture monitor diffraction gratings 232 are of the transmission type. A central portion of the mask 23 which is located on the front surface of the illuminating portion 21 is configured so that light emitted from the illuminating portion 21 transmits therethrough as it is.

The upper left, upper right, lower left, and lower right displacement detection diffraction gratings 231 form a-, b-, ab-, and bb-phase diffraction gratings having spatial phase relationships of 0°, 90°, 180°, and 270° at equal pitches, respectively. The upper and lower posture monitor diffraction gratings 232 form diffraction gratings having the same spatial phase relationship of 0° at equal pitches.

Figure 5:
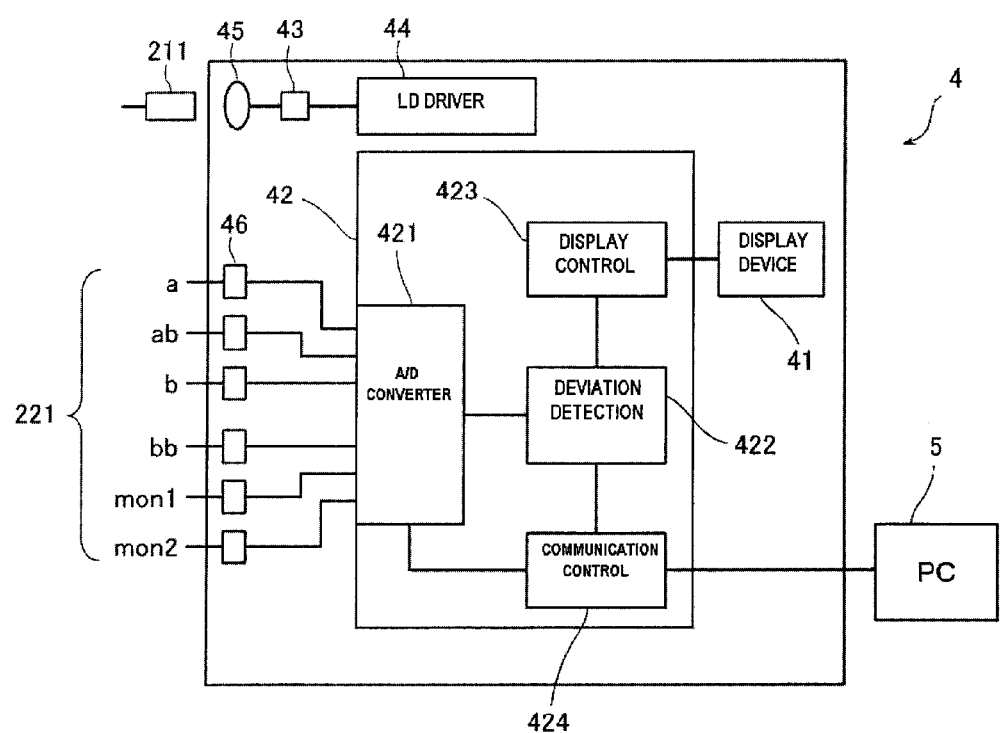
FIG. 5 is a block diagram showing a configuration of a signal processing device of the photoelectric encoder.

Next, the signal processing device 4 of the photoelectric encoder will be described. FIG. 5 is a block diagram showing the configuration of the signal processing device 4 of the photoelectric encoder of the first embodiment of the invention.

The signal processing device 4 has, for example, an LD 43 as a light source in a portion to which a basal end portion of the illumination optical fiber 211 is to be connected. The LD 43 is driven by a LD driver 44 to emit coherent light. The coherent light enters the illumination optical fiber 211 through an optical system 45, and is guided through the core of the illumination optical fiber 211 to be irradiated from the illuminating portion 21 of the tip end of the core toward the scale 1.

The signal processing device 4 further has six light receiving elements 46 which detect light received by the six light receiving portions 22, in a portion to which a basal end portion of the light-receiving optical fibers 221 is to be connected. The six light receiving elements 46 output displacement detection signals a, b, ab, and bb and posture monitor signals mon1, mon2, respectively. The signals are converted to digital signals by an A/D converter 421. A deviation detecting circuit 422 is connected to the A/D converter 421, and detects information indicating the attachment posture of the detection head 2 with respect to the scale 1, from information supplied from the A/D converter 421. The detected information is supplied to the display device 41 through a display controlling circuit 423, and displayed on the display device 41. The displacement detection information a, b, ab, and bb and posture monitor information mon1, mon2 which are converted to digital signals by the A/D converter 421 are transmitted to a PC 5 which is an external information processing apparatus, through a communication controlling circuit 424. Based on the received information, the PC 5 calculates and displays the relative position of the detection head 2 with respect to the scale 1.

Figure 6:
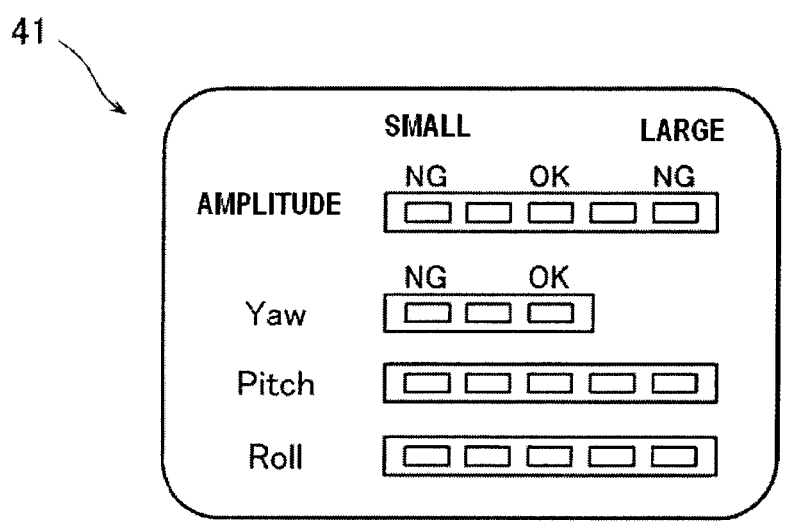
FIG. 6 is a view showing an example of a display device of the photoelectric encoder.

FIG. 6 is a view showing an example of the display device 41 of the photoelectric encoder of the embodiment. The display device 41 has an indicator indicating three parameters showing the signal amplitude and the attachment posture of the detection head 2 with respect to the scale 1. In the embodiment, the three parameters showing the attachment posture of the detection head 2 with respect to the scale 1 are Yaw, Pitch, and Roll which will be described later. As the indicator, various display units such as an LED, a liquid crystal, and an EL may be used. An error from an adequate attachment position may be converted to a numerical value and then displayed.

A configuration where the thus configured display device 41 is disposed in the detection head 2 is not preferable because the device operates also as a heat generating source, and is affected by electromagnetic noise, and miniaturization is hardly performed. In the photoelectric encoder of the embodiment, therefore, the display device 41 is disposed in the signal processing device 4 which is separated from the detection head 2.

Next, a method of attaching and adjusting the detection head 2 of the photoelectric encoder of the embodiment will be described.

Figure 7:
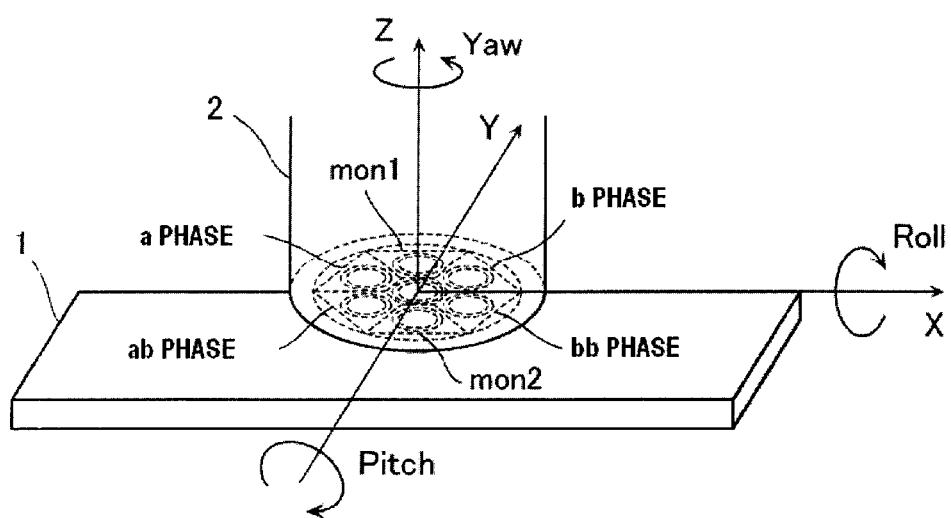
FIG. 7 is a view showing an attachment posture of the detection head of the photoelectric encoder.

FIG. 7 is a view showing the attachment posture of the detection head 2 of the photoelectric encoder of the first embodiment of the invention. In the description, the relative moving direction of the detection head 2 with respect to the scale 1 is indicated as the X-axis direction, the direction which is parallel to the surface of the scale 1, and which is perpendicular to the X-axis direction is indicated as the Y-axis direction, and the direction which is perpendicular to the X- and Y-axes directions, i.e., that which is perpendicular to the surface of the scale 1 is indicated as the Z-axis direction. The inclination between the scale 1 and the detection head 2 in the X-Z plane is indicated as the P (Pitch) direction, that in the Y-Z plane is indicated as the R (Roll) direction, and that in the X-Y plane is indicated as the Ya (Yaw) direction.

When the detection head 2 is to be attached or adjusted, the attachment posture of the detection head 2 is detected from the signals mon1, mon2, a, b, ab, and bb which are obtained by moving the detection head 2 with respect to the scale 1.

Figure 8A:
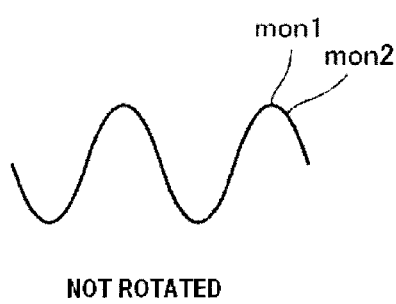
FIG. 8A shows a single-phase signal in a case where the detection head in the photoelectric encoder is not rotated in a Yaw direction.
Figure 8B:
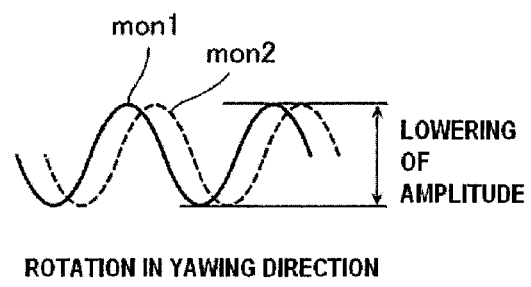
FIG. 8B shows a single-phase signal in a case where the detection head in the photoelectric encoder is rotated in the Yaw direction.

In the case where the detection head 2 is rotated in the Ya direction, the phase relationship between the signals mon1, mon2 in the direction (the Y-axis direction in FIG. 7) which is perpendicular to the scale is lost. In the case where the detection head is rotated in the Ya direction, the signal level is lowered while the phase difference is changed. FIGS. 8A and 8B show the manner in this case. When the difference between the signals mon1, mon2 is obtained, it is possible to determine whether the mon1, mon2 signals are in phase or not (if in phase, the difference is zero). When the rotation in the Ya direction is advanced, however, a position where the signals are again in phase exists. Therefore, the signal amplitudes are separately detected, whereby the detection in the Ya direction is performed. When the signal amplitudes are maximum and the difference between the signals mon1, mon2 is zero, namely, it is determined that the inclination in the Ya direction does not exist.

Figure 9A:
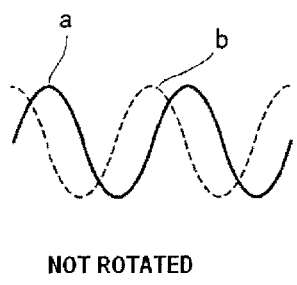
FIG. 9A shows a single-phase signal in a case where the detection head in the photoelectric encoder is not rotated in a Pitch direction.
Figure 9B:
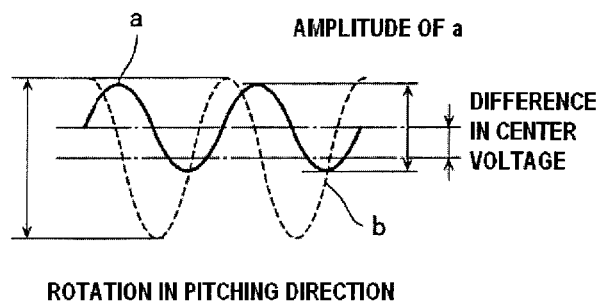
FIG. 9B shows a single-phase signal in a case where the detection head in the photoelectric encoder is rotated in the Pitch direction.

When the detection head 2 is rotated in the P direction, differences in amplitude and center voltage (reference voltage) are formed in the signals a, ab and b, bb in the X-axis direction in FIG. 7. FIGS. 9A and 9B show the manner in this case. In FIGS. 9A and 9B, it is assumed that the detection head 2 is rotated in the P direction in FIG. 7. In this case, in the signal b in the direction along which the head approaches the scale, the amplitude is increased, and, in the signal a in the direction along which the head separates from the scale, the amount of light received by the light receiving portions 22 is reduced, and the amplitude is lowered. When the difference between the amplitudes or center voltages of the signals a, b is detected, therefore, it is possible to detect the deviation in the P direction, and, when it is determined which one of the amplitudes or the center voltages is higher, also the direction of the deviation can be determined.

The signals a, ab have a phase difference of 180°, and also the signals b, bb have a phase difference of 180°. When the signals a, ab or the signals b, bb are added to each other, therefore, the resulting value is a DC value. When the added value of the signals a, ab is compared with that of the signals b, bb, the deviation in the P direction can be detected. According to this method, it is not required to detect the difference between the amplitudes or that between the center voltages, and therefore the deviation in the P direction can be detected more simply.

Figure 10A:
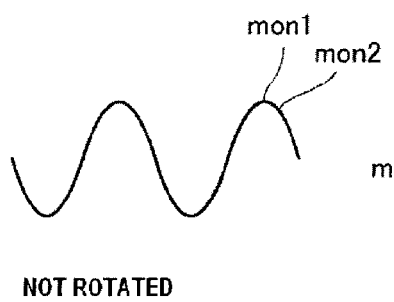
FIG. 10A shows a single-phase signal in a case where the detection head in the photoelectric encoder is not rotated in a Roll direction.
Figure 10B:
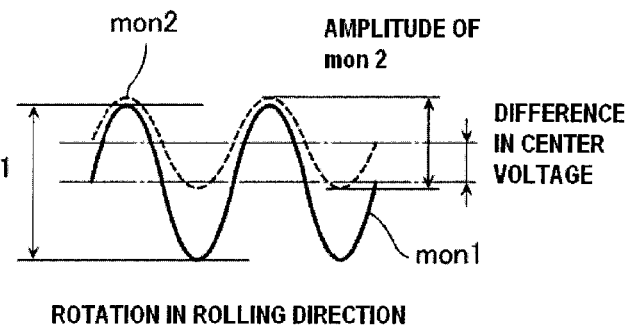
FIG. 10B shows a single-phase signal in a case where the detection head in the photoelectric encoder is rotated in the Roll direction.

When the detection head 2 is rotated in the R direction, differences in amplitude and center voltage are formed in the signals mon1, mon2 in the Y-axis direction in FIG. 7. FIGS. 10A and 10B show the manner in this case. In the signal (mon1 in FIG. 7) in the direction along which the head approaches the scale, the amplitude is increased, and, in the signal (mon2 in FIG. 7) in the direction along which the head separates from the scale, the amplitude is decreased. When the difference between the amplitudes or center voltages of the signals mon1, mon2 is detected, it is possible to detect the deviation in the R direction, and, when it is determined which one of the amplitudes or the center voltages is higher, also the direction of the deviation can be determined.

When the signals output from the fibers are analyzed based on these results, it is possible to check the attachment posture of the detection head 2.

Figure 11:
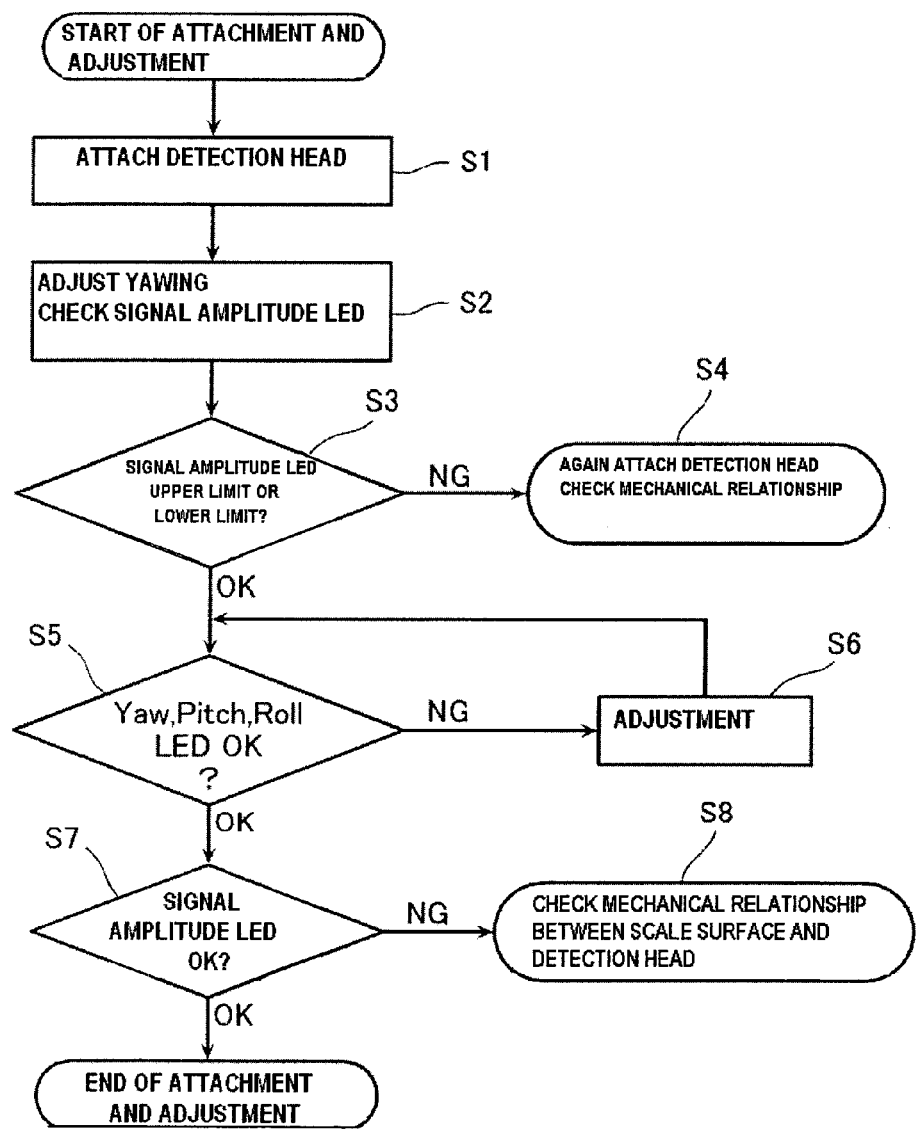
FIG. 11 is a flowchart of the work of attaching and adjusting the detection head in the photoelectric encoder.

FIG. 11 is a flowchart of the work of attaching and adjusting the detection head 2 in the photoelectric encoder of the first embodiment of the invention. First, the detection head 2 is attached to a predetermined position (S1). Next, the detection head 2 is moved to adjust the attachment position of the detection head 2 in the Ya direction so that the amplitude of the reception signal received by the detection head 2 is within an adequate range on the screen of the display device 41 (S2). Then, it is checked whether the amplitude of the reception signal is within the adequate range or not (S3). If not within the range, the work of attaching the detection head 2 is again performed (S4). In this case, checking whether the distance between the scale 1 and the detection head 2 is adequate or not, and that whether the light emission level of the light emitting element and the light receiving level of the light receiving element are adequate or not may be performed. If the intensity level of the reception signal is within the adequate range, the attachment angle is adjusted while checking whether attachment angles in the P, R, and Ya directions are adequate or not, on the screen of the display device 41 (S5, S6). Finally, it is again checked whether the intensity level of the reception signal is adequate or not. If the level is not within the adequate range, the positional relationship between the scale 1 and the detection head 2 is checked, and, if the relationship is within the range, the work is ended (S7, S8).

In the photoelectric encoder of the first embodiment of the invention, when the detection head 2 is to be attached, it is not required to use an oscilloscope, and the attachment posture of the detection head 2 can be easily checked. Therefore, the workability of attachment and adjustment of a detecting portion is improved.

The cable 3 which extends from the detection head 2 allows the signal processing device 4 to be disposed at a position separated from the detection head 2. The whole of the detection head 2 is configured by optical components, and does not have an electric system. Therefore, the device has a structure which is very small, which does not have a heat generating source, and which is not affected by electromagnetic noise. The embodiment provides a measurement system that is effective in an apparatus in which accurate positioning is necessary, such as a semiconductor/liquid crystal exposure apparatus, or that which is used in an environment where a remote operation is required, such as in an atomic/chemical plant or measurement in vacuum.

[Second Embodiment]

In the first embodiment, the display device 41 is disposed in the signal processing device 4. Alternatively, a display which is disposed in an external information processing apparatus such as the PC 5 connected to the signal processing device 4 may be used as the display unit for adjusting the attachment posture.

Also in this case, the display unit can be disposed at a place separated from the detection head 2, and therefore there is an advantage that the attaching and adjusting work can be easily performed.

[Third Embodiment]

Figure 12:
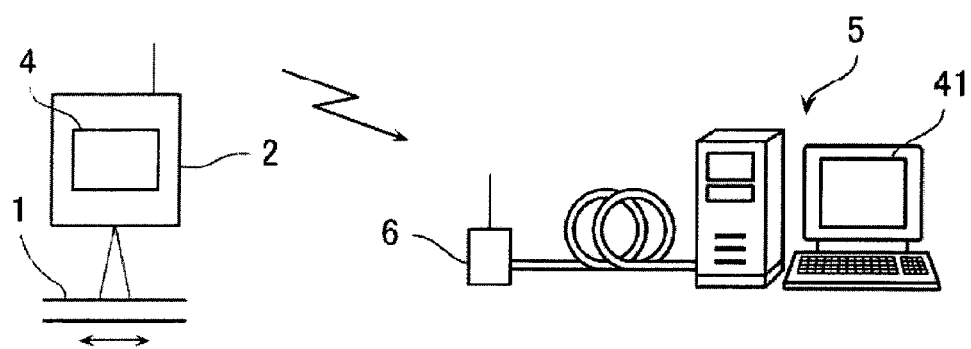
FIG. 12 a view showing a configuration of a photoelectric encoder of a third embodiment of the invention

FIG. 12 shows the configuration of a photoelectric encoder of a third embodiment. The third embodiment is basically identical with the first embodiment, but different therefrom in that the signal processing device 4 is incorporated in the detection head 2, and that the output signal from the signal processing device 4 is supplied to the PC 5 through a wireless transmitting unit 6. In this case, a display of the PC 5 functions as the display device 41.

[Other Embodiments]

The work of attaching and adjusting the detection head 2 in the photoelectric encoder may be manually performed, or performed by remote control. In the case where the work is performed by remote control, it is contemplated that an actuator which can adjust the posture by remote control may be disposed in an attaching portion for the detection head 2. In this case, the position of the detection head 2 can be adjusted in a hardly accessible place such as an environment where a temperature change is not preferred, or a vacuum environment. Furthermore, it is contemplated that the actuator is feedback controlled based on information of an error of the attachment posture, and the posture is automatically controlled.

Further, in the first and second embodiments, a wireless transmitting unit may be used instead of the cable 3. Furthermore, in the third embodiment, a cable may be used instead of the wireless transmitting unit 6.

What is claimed is:

1. A photoelectric encoder comprising:
a scale in which diffraction gratings are formed at predetermined pitches in a measurement axis direction;
a detection head which is relatively movable with respect to the scale, and which includes an illuminating portion configured to illuminate the scale, and a light receiving portion configured to receive light reflected by or transmitted through the diffraction gratings of the scale;
a signal processing device configured to process a light reception signal output from the light receiving portion of the detection head, the signal processing device comprising a display unit configured to display information indicating an attachment posture of the detection head with respect to the scale;
a signal transmitting unit configured to transmit a signal between the detection head and the signal processing device; and
a plurality of transmission type diffraction gratings, which are placed on a light receiving surface of the light receiving portion and are placed at an equal distance from the illuminating portion, wherein
the light receiving portion includes a displacement detection light receiving portion configured to detect pitching of the light receiving surface with respect to the scale about the illuminating portion, and a posture monitor light receiving portion configured to detect rolling and yawing of the light receiving surface with respect to the scale about the illuminating portion,
the display unit is configured to display the pitching, rolling, and yawing,
the displacement detection light receiving portion has four displacement detection light receiving surfaces, which are equally placed about the illuminating portion in the measurement axis direction and a direction that is perpendicular to the measurement axis direction, and on which transmission type diffraction gratings of four phases that are shifted by 90° from each other are placed,
the posture monitor light receiving portion has two monitor light receiving surfaces, which are equally placed about the illuminating portion in a direction that is perpendicular to the measurement axis direction and on which a pair of transmission-type diffraction gratings is placed, and the signal processing device is configured to detect pitching of the light receiving surfaces from an amplitude difference of light reception signals of the displacement detection light receiving portion, to detect rolling from an amplitude difference of light reception signals of the posture monitor light receiving portion, and to detect yawing from a phase difference of the light reception signals of the posture monitor light receiving portion.

2. The photoelectric encoder according to claim 1, wherein the signal transmitting unit is a cable.

3. The photoelectric encoder according to claim 1, wherein the signal transmitting unit is a wireless transmitting unit.

4. The photoelectric encoder according to claim 1,
wherein the light receiving portion is placed in a periphery of the illuminating portion with forming a predetermined gap in the measurement axis direction and a direction which is perpendicular to the measurement axis direction, and is configured to receive the light which is emitted from the illuminating portion and reflected by the diffraction gratings of the scale.

5. The photoelectric encoder according to claim 1, wherein the signal processing device is further configured to detect pitching of the light receiving surfaces from the amplitude difference and a center voltage difference of light reception signals of the displacement detection light receiving portion and to detect rolling from the amplitude difference and a center voltage difference of light reception signals of the posture monitor light receiving portion.

6. The photoelectric encoder according to claim 2,
wherein the detection head includes a first optical fiber which has the illuminating portion at a tip end, a plurality of second optical fibers which are placed in a periphery of the first optical fiber, and which have the light receiving portion at a tip end, and a cylindrical ferrule which covers the tip end sides of the first and second optical fibers, and
the cable includes the first and second optical fibers.

7. A photoelectric encoder system comprising:
a photoelectric encoder including a scale in which diffraction gratings are formed at predetermined pitches in a measurement axis direction, a detection head which is relatively movable with respect to the scale, and which includes an illuminating portion configured to illuminate the scale, and a light receiving portion configured to receive light reflected by or transmitted through the diffraction gratings of the scale, and a signal processing device configured to process a light reception signal output from the light receiving portion of the detection head;
an information processing apparatus which is connected to the signal processing device through a first signal transmitting unit, the information processing apparatus including a display unit configured to display information indicating an attachment posture of the detection head with respect to the scale; and
a plurality of transmission type diffraction gratings, which are placed on a light receiving surface of the light receiving portion and are placed at an equal distance from the illuminating portion, wherein
the light receiving portion includes a displacement detection light receiving portion configured to detect pitching of the light receiving surface with respect to the scale about the illuminating portion, and a posture monitor light receiving portion configured to detect rolling and yawing of the light receiving surface with respect to the scale about the illuminating portion, the display unit is configured to display the pitching, rolling, and yawing,
the displacement detection light receiving portion has four displacement detection light receiving surfaces, which are equally placed about the illuminating portion in the measurement axis direction and a direction that is perpendicular to the measurement axis direction, and on which transmission type diffraction gratings of four phases that are shifted by 90° from each other are placed,
the posture monitor light receiving portion has two monitor light receiving surfaces, which are equally placed about the illuminating portion in a direction that is perpendicular to the measurement axis direction and on which a pair of transmission-type diffraction gratings is placed, and
the signal processing device is configured to detect pitching of the light receiving surfaces from an amplitude difference of light reception signals of the displacement detection light receiving portion, to detect rolling from an amplitude difference of light reception signals of the posture monitor light receiving portion, and to detect yawing from a phase difference of the light reception signals of the posture monitor light receiving portion.

8. The photoelectric encoder system according to claim 7, wherein the signal processing device is further configured to detect pitching of the light receiving surfaces from the amplitude difference and a center voltage difference of light reception signals of the displacement detection light receiving portion and to detect rolling from the amplitude difference and a center voltage difference of light reception signals of the posture monitor light receiving portion.

9. The photoelectric encoder system according to claim 7, wherein the signal processing apparatus is provided in the detection head.

10. The photoelectric encoder system according to claim 7, wherein the signal processing apparatus is connected to the detection head via a second signal transmitting unit.

11. The photoelectric encoder system according to claim 10, wherein the second signal transmitting unit is a cable.

12. The photoelectric encoder system according to claim 10, wherein the second signal transmitting unit is a wireless transmitting unit.

13. The photoelectric encoder system according to claim 9, wherein the first signal transmitting unit is a cable.

14. The photoelectric encoder system according to claim 9, wherein the first signal transmitting unit is a wireless transmitting unit.

15. The photoelectric encoder system according to claim 7, wherein the light receiving portion is placed in a periphery of the illuminating portion with forming a predetermined gap in the measurement axis direction and a direction which is perpendicular to the measurement axis direction, and is configured to receive the light which is emitted from the illuminating portion and reflected by the diffraction gratings of the scale.

16. The photoelectric encoder system according to claim 11, wherein the detection head includes:
a first optical fiber which has the illuminating portion at a tip end;
a plurality of second optical fibers which are placed in a periphery of the first optical fiber, and which have the light receiving portion at a tip end; and
a cylindrical ferrule which covers the tip end sides of the first and second optical fibers, and
the cable includes the first and second optical fibers.

* * * * *